March 17, 1953  A. F. HAYEK  2,631,493

SPRING CLAW INTERMITTENT MOVEMENT

Filed June 29, 1951

INVENTOR.
ARTHUR F. HAYEK
BY
ATTORNEY.

Patented Mar. 17, 1953

2,631,493

UNITED STATES PATENT OFFICE 2,631,493

SPRING CLAW INTERMITTENT MOVEMENT

Arthur F. Hayek, Pleasantville, N. Y., assignor to General Precision Laboratory Incorporated, a corporation of New York Application June 29, 1951, Serial No. 234,219

6 Claims. (Cl. 88—18.4)

1

This invention pertains to claw intermittent movements of the type useful in the motion picture art and is especially directed to a mechanism for reducing the strain upon the film during its intermittent advancement.

The claw type of intermittent mechanism now in general use in motion picture cameras and in 8 and 16 mm. projectors consists of a solid three-pronged claw carried by a pivoted lever. At the fulcrum of the lever a cam imparts a motion of translation to the lever and to the claw carried thereby to advance the film, and a second cam motion simultaneously imparts a rocking motion to the claw end of the lever so that it engages and disengages the film. Difficulties experienced with this design include the inability to enclose the mechanism because of the rocking motion of the lever, and a tendency of the claws to tear the film during pulldown.

Motion picture film shrinks during its life by an amount that is conservatively a maximum of 1%, so that the distance between perforations may vary to this extent. Since the conventional claw intermittent has a solid three-pronged steel claw with fixed distances between the prongs, obviously it will be exceptional if the three prongs bear equally on the three film perforations in which they are engaged during the pulldown operation. In general, only one prong will bear on the edge of its associated perforation and the other prongs will not touch their respective perforation edges. If the claw dimensions are made correct for raw film, their prong separations will be too great for shrunken film, and if designed for film having maximum shrinkage, the prong spacing will be too short for fresh film. Since the 16 mm. perforation spacing distance is 0.300 inch, 1% shrinkage reduced the distance by .003 inch in one frame or by .006 inch in two frames. Obviously it is impossible to design a solid three-pronged claw that will in general make contact with more than one perforation during pulldown.

The maximum pulldown speed is limited by the strength of the film, and an acceleration which stresses the edge of a film sprocket perforation beyond its strength will tear the film. Obviously if the pulldown acceleration force is divided equally between two perforations the stress on each is halved, and if divided equally among three, each stress is only one-third of the total. One way therefore, in which the destructive stress exerted by a prong on the edge of the film perforation can be reduced is by dividing the pulldown force equally among two or more claw prongs applied to an equal number of separate film perforations.

2

The conventional claw prong is made considerably smaller than the film perforation so that it will not rub on the rear edge of the perforation. But in order to secure adequate vertical registration and to avoid vertical jiggle of the picture the film must come to rest in the film gate within .001 inch or less of its ideal position. To insure this result a friction shoe is conventionally employed to bear on the margin of the film at the gate, and experience has shown that its friction drag must at least equal the value of the intermittent deceleration force to prevent bounce.

In ordinary 16 mm. film projection, in which the pulldown angle is 45°, a length of film about five inches in length is subjected by the intermittent to an acceleration which, if constant, has a value of 100 G's, from which the force applied to the film thereby is computed to be about $\frac{1}{10}$ pound. There is also an additional force of at least $\frac{1}{10}$ pound required to be applied to the film by the film trap drag, making a total force of $\frac{2}{10}$ pound.

In order to use a claw intermittent in the motion picture recording of television, utilizing the system in which the motion picture pulldown occurs during the television vertical fly-back time, the motion picture pulldown angle must be no greater than 9°. This demands a pulldown action five times faster than in conventional projection, so that the constant acceleration and the force exerted thereby on the film are 25 times greater than before, or 2½ pounds. Since the film trap drag must be of at least the same amount, the total force is 5 pounds. This amount of force applied to a single perforation is more than the breaking strength of the film of 3 pounds can withstand, and will rupture the film. Even if equally divided among three perforations the resulting 1⅔ pounds per perforation will be too near to the breaking strength for safety and long life and will result in possible breakage or rapid wear and early failure of film.

The instant invention consists of three pairs of spring-mounted prongs for insertion in three consecutive film perforations in such a way as to apply equal pulldown force to the three perforations. Moreover, the claw design is such as to eliminate the need for film trap drag while still insuring perfect vertical registration of the picture. The film trap drag can therefore be reduced to merely that necessary to hold the film flat in the optical plane of the aperture, a drag in the order of .05 pound, so that the total force on the film when used in television recording apparatus is 2.55 pounds. This force when divided among three perforations results in a maximum force of only .85 pound per perforation which is a reasonable value.

The elimination of most film trap drag also greatly eases the emulsion pile-up problem, which is very serious in the case of the long camera runs required in television recording.

For these reasons the instant invention makes practical the employment of pulldown intervals as short as 9°, and thus provides a hitherto unavailable but essential component for recording television pictures wherein the film strip is advanced during fly-back time or retrace of the picture tube cathode ray beam.

One purpose therefore, of this invention is to provide a claw intermittent having a very short pulldown interval.

Another purpose is to provide a claw intermittent which stresses the film lightly.

Still another purpose is to provide a claw intermittent which applies its pulling force equally at more than one film perforation.

A further purpose is to provide a claw intermittent which does not require film trap drag to insure vertical registration.

Other purposes will become evident in the detailed description and the associated drawings, in which.

Figure 1:
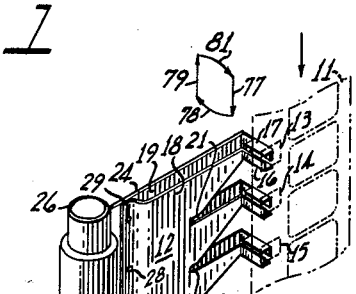
Figure 1 is an isometric view of a claw intermittent mechanism embodying the invention.

Referring now to Fig. 1, a vertical strip of motion picture film is indicated at 11 by dashed lines so as not to obscure other features. The film may be 35 mm., 16 mm., 8 mm. or of any other size, but as an example 16 mm. film is here represented. The depicted intermittent may be employed equally well in either a projector or a camera, although for the purpose of discussion its use in a projector is assumed. Intermittent downward motion of the film is caused by the three prongs of a claw 12, these prongs being depicted thrust into three consecutive perforations 13, 14 and 15 of the film 11.

The three prongs are similar in construction, each consisting of an advance section such as that indicated at 16 and a rear section as indicated at 17. Both sections are formed from leaf springs by bending the tip of the spring at an approximate right angle to the body, the advance section 16 being fabricated from the leaf spring 18 and the rear section 17 being fabricated from the leaf spring 19. All of the leaf springs such as 18 are in turn formed by making two slits 21 and 22 in a broad spring 23, partly separating it into three equal sections, and similarly the three rear springs such as 19 are formed by making two similar slits in a second broad spring 24. The spring 24 is bent around a rod 26 and secured thereto, and the broad spring 23 is secured by an appropriate means, such as riveting by rivets 27, 28 and 29, to the spring 24. Alternatively the spring 23 may be nested within the spring 24 at the rod 26 and both secured thereto so that the separation between the advance and rear springs is preserved to permit individual and independent resilient action of all six leaf springs formed therefrom.

Figure 2:
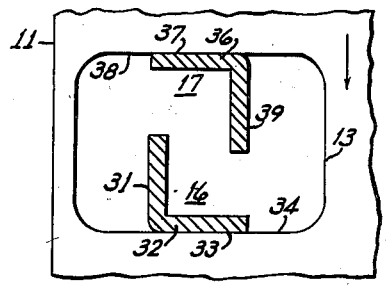
Figures 2 and 3 are enlarged views of one claw prong.
Figure 3:
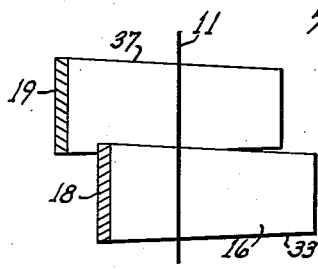

The detailed construction of one prong sectioned in the plane of the film is illustrated in Fig. 2. The advance section 16 is formed by bending the leg 31 at a right angle to the main body of the spring 18, Fig. 1. The right angled tip so formed is then further made L-shaped in cross section by providing the stamped tip with a struck-up portion which is bent at a right angle to the leg 31 to form a film engaging leg 32. The lower or advance edge 33 of the leg 32 is in contact with the lower or advance edge 34 of the film perforation 13. Contact between the prong section edge 33 and the film perforation edge 34 is gained at the time the prong is inserted into the perforation by reason of the taper of the prong, as is illustrated in Fig. 3 by the slant of the edge 33 of the prong section 16. Maintenance of this contact during all parts of the pulldown action is secured by the torsional resilience of the flat spring 18, which constantly urges the edge 33 toward the film edge 34 and maintains pressure thereon, even during the deceleration portion of the pulldown film cycle.

Similarly, the rear section 17 is L-shaped, having a leg 36 with its upper or rear edge 37 in contact with the upper or rear edge 38 of the perforation 13, and having a stiffening leg 39. The latter leg 39 is formed by bending the tip of the spring 19 at a right angle to the main body thereof, Figs. 1 and 2, and the rear leg 37 is stamped and formed from the stiffening leg 39 by longitudinal bending. Pressure of the rear section against the rear edge of the perforation is attained upon insertion of the prong by reason of the taper design as indicated by the slanting surface 37, Fig. 3, and pressure is maintained during the entire pulldown cycle, even during the acceleration portion thereof, by reason of the torsional resilience of the spring 19.

In operation, the resilience of the springs 18 and 19 constantly urge the edge 37 of the rear prong section against the film edge 38 and the edge 33 of the forward prong section against the film edge 34 and maintains the pressure between both prong edges and horizontal edges of a film perforation. This pressure is of such value that during the deceleration part of the pulldown cycle the forward edge 33 of the prong is not permitted to lose contact with the leading edge 34 of the film perforation. Moreover, the deflections of the springs 18 and 19 are held to such small values as to reduce to a negligible amount the positional uncertainty of the film during the dwell period. Thus at the end of the deceleration portion of the pulldown cycle, at which time the dwell portion begins and the claw is withdrawn from the film perforations, the film position is definite and perfect framing is preserved from frame to frame without necessitating the use of a film trap drag.

Figure 4:
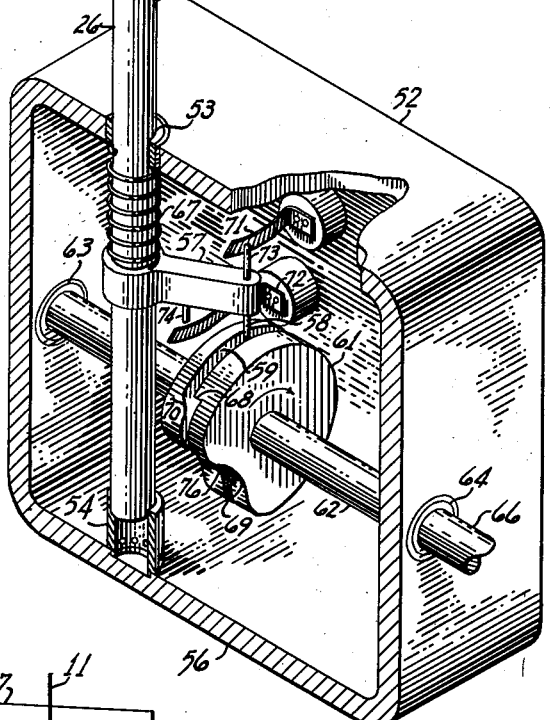
Figure 4 illustrates the action of the claw intermittent mechanism in entering perforations in shrunken film.
Figure 4:
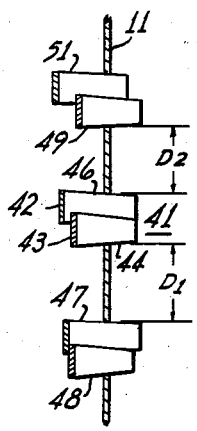

A better understanding of the operation of this claw is secured by a consideration of the simultaneous action of all three prongs as illustrated in Fig. 4. This figure illustrates the manner in which the resilient prong sections conform to the film perforations and make contact at both forward and rear edges of each perforation, even though the film has shrunk so that its perforation-to-perforation dimension is less than the distance from one prong to the next.

The middle prong 41 is illustrated as engaging a perforation with normal and equal deflections of both springs 42 and 43, so that the advance prong section 44 and the rear prong section 46 are inserted equal distances, which may be termed the normal distances, into the perforation to make simultaneous contact at its top and bottom edges. But the distance D1 measured between the film perforation edges is assumed to be less than the corresponding prong distance, so that the rear prong section 47 enters its perforation by an amount that is somewhat greater than normal. The advance prong section 48 enters the same perforation somewhat less than the normal distance, but like the section 47 enters until it makes contact with the perforation edge. Similarly the distance D2 between film perforations is assumed to be somewhat less than the corresponding prong distance, and the advance prong section 49 therefore enters its perforation a further distance than normal before it is stopped by the film edge, while the rear section 51 enters the same perforation for a somewhat less distance than normal. This compensation for varying distances between film perforations is of course accomplished by reason of the tapered formation of the prong tips and the torsional resilience of the respective spring arms 18 and 19.

Thus both sides of all three prongs make contact with the top and bottom edges of their respective film perforations, each contact being resilient and applying but a small amount of spring pressure to the film edge.

Returning now to Fig. 1, the mechanism for imparting appropriate rotating and axial translation motions to the rod 26 and hence the claw 12 will now be described. The rod 26 enters a frame 52 through a sleeve bearing 53 and is terminated in a sleeve slide bearing 54 in the lower wall 56 of the same frame 52. The rod thus has rotational and also longitudinal translational freedom. Between the two bearings 53 and 54 there is secured to the rod 26 an arm 57 carrying at its free end a follower pin 58. The follower pin 58 engages a cam slot 59 in a cam 61 which is generally cylindrically shaped, the cam slot 59 being cut into its periphery. The cam 61 is fixed to a shaft 62 which is journalled in two bearings 63 and 64 in the side walls of the frame 52 and rotating driving motion may be imparted to the shaft 62 by any suitable means (not shown). The number of revolutions per second of the cam 61 must be the same as the number of frames per second of advancement of the film that is desired. For instance, 16 mm sound film requires a constant speed of the shaft 62 of 24 revolutions per second.

The cam 61 is provided with a radius, so that the follower 58 is driven up and down, forcing the arm 57, the rod 26 and the claw 12 to rise against the pressure of a helical compression spring 67, and permitting these components to return downward under the impulsion of the spring 67, so that the follower 58 is in constant contact with the groove 59. The cam groove 59 is also offset axially at 68 on the surface of the cam 61, thereby imparting rotary motion to the rod 26. The axial offset 68 is rectilinear so that a snap action is possible, while the opposite wall 70 of the groove is made slanting to insure the axial movement of the follower.

Associated with the cam 61 are two cantilever springs 71 and 72 secured to the frame 52. The spring 71 is arranged to bear on the end of a pin 73 that is an extension of the follower pin 58, but the spring bears on this pin only when the cam is at or near its maximum radius position. Likewise the spring 72 is arranged to bear on the end of a pin 74, but only when the follower is at the shorter radius portions of the cam.

In the sequence of operations of this intermittent movement the claw 12 is inserted into the film perforations, the claw then assuming the position depicted in Fig. 1. The cam 61 then causes the follower 58 to drop along the reduced radial position 76, rapidly impelled by the spring 67 and this motion causes the claw 12 to pull the film 11 down by the distance of exactly one frame. This motion is represented by the arrow 77. The cam 61 then causes the follower 58 to move axially thereon, withdrawing the claw 12 from the perforations. This motion is represented by the arrow 78. The cam 61 then, because of the radial slope 69, forces the follower 58 upward, compressing the spring 67. This motion is represented by the arrow 79. Finally, the cam 61 moves the follower 58 axially at 68, causing the three claw prongs again to enter three consecutive film perforations. This motion is represented by the arrow 81 and completes one full cycle of intermittent operation by which the film 11 has been advanced by one frame.

It will be appreciated that the pulldown motion is generally represented by the graphic arrow 77 which, in the case of 9° pulldown, represents motion controlled by the portion 76 of the cam covering 9° of one cam revolution. However, some film movement may be occasioned during the claw insertion stroke 81 and during the claw removal stroke 78 by reason of the contacts that the prongs make with the edges of the perforations, therefore these strokes are preferably made as quickly as possible. This is accomplished by making rectilinear bends, such as bend 68, in the cam path and by snapping the follower into each bend by the use of springs 71 and 72. In executing the action indicated at 79, by the cam curve 69, the follower 58 is raised with the result that the pin 73 is elevated into forceable contact with the spring 71, which it bends. This bend puts side pressure on the pin 73, so that when the cam has revolved to the bend 68 the spring 71 impels the pin 73 with the associated follower 58 sharply toward the right thus inserting the claw prongs into the perforations with great rapidity. This action may therefore be incorporated in the 9° pulldown time with little difficulty. Similarly, the retracting action represented by the arrows 78 and effected by a rectilinear bend in the cam path similar to that at 68 but located at the beginning of the portion 69, is in the nature of a snap motion, so that the withdrawal of the prongs from the perforations is very rapid and is effected within such a short time that it can be included as part of the 9° pulldown.

Alternatively, instead of placement of the springs 71 and 72 as described, they can be placed on the cam 61 and fastened thereto to act on the follower 58 when it arrives at each of the axial bends in the cam track.

The frame 52 is in box form and is adaptable to be closed on all sides to make an oil-tight enclosure for the cam 61, permitting it to be run in oil for smooth operation, long life and low noise. This is a consequence of the means of operation of the claw 12, consisting of the rod 26, and of the method of operating this rod by both rotating and translating it, so that the bearing 53 can easily be made oil tight by conventional design thereof.

It is of course to be understood that a variety of other well-known cam arrangements are available for use in place of the described cam arrangement and will serve as well to produce the described claw motions.

What is claimed is:

1. A claw intermittent mechanism for advancing a perforated film strip comprising, a claw body containing a plurality of claw prongs, each of said claw prongs being spaced from the next adjacent prong by substantially the distance between film strip perforations, each prong containing two separate elongated fingers each having individual axial resiliency, said two fingers forming each prong being spaced from each other in a direction longitudinally of said film strip whereby an edge of one finger of each prong engages the trailing edge of a respective film perforation and an edge of the other finger of each prong engages the leading edge of said respective film perforation, said film engaging edges being tapered in a direction normal to said film strip, and means for actuating said claw body to cause said fingers to engage and disengage said film strip perforation.

2. A claw intermittent mechanism for advancing a perforated film strip comprising, a pair of flat arm members fastened together at one end and positioned adjacent to but spaced from each other throughout the reminder of their length, said arm members being resilient in a direction toward and away from each other, each of said arm members having its anterior end portions bent at right angles to the main body portions to engage a perforation of said film strip, said bent end portions being spaced with respect to each other in a direction longitudinally of said film strip whereby the leading edge of said perforation is engaged by an edge of one bent end portion and the following edge of said perforation is engaged by an edge of the other of said bent end portions.

3. A claw intermittent mechanism for advancing a perforated film strip comprising, a pair of flat arm members fastened together at one end and positioned adjacent to but spaced from each other throughout the remainder of their length, said arm members being resilient in a direction toward and away from each other but rigid in a direction normal thereto, each of said arm members having its anterior end portions bent at right angles to the main body portions to be moved into engagement with a film strip perforation, said bent end portions being spaced with respect to each other in a direction longitudinally of said film strip whereby the leading edge of said perforation is engaged by an edge of one bent end portion and the following edge of said perforation is engaged by an edge of the other bent end portion, the film engaging edges of said bent end portions being tapered in a direction normal to the plane of said film strip.

4. A claw intermittent mechanism for advancing a perforated film strip comprising, a claw body composed of two flat spring members fastened together at one end and spaced from each other at their opposite ends, the spaced ends of said spring members being slit longitudinally of their length to provide a plurality of pairs of claw prongs, each of said claw prongs being provided with a bent end portion forming a plurality of pairs of film strip perforation engaging fingers, each pair of perforation engaging fingers being positioned adjacent each other for engagement of a single film strip perforation and each pair being spaced from the next adjacent pair by substantially the distance between film strip perforations, each pair of perforation engaging fingers being spaced from each other in a direction longitudinally of said film strip whereby an edge of one finger of each pair engages the trailing edge of a respective film perforation and an edge of the other finger of each pair engages the leading edge of said respective film perforation, and means for actuating said claw body to cause said fingers to engage and disengage said film strip perforations.

5. A claw intermittent mechanism for advancing a perforated film strip comprising, a claw body composed of two flat spring members having their flat sides fastened together at one end and spaced from each other at their opposite ends, the spaced ends of said spring members being slit longitudinally for a portion of the length of said claw body to provide a plurality of juxtaposed pairs of claw prongs, each of said claw prongs being bent at right angles to said claw body at its extreme end to form a plurality of pairs of film strip perforation engaging fingers, each pair of fingers being positioned closely adjacent each other for engagement of a single perforation by each pair and each pair being spaced from the next adjacent pair by substantially the distance between film strip perforations, the separate spring fingers forming each pair being spaced from each other in a direction longitudinally of said film strip whereby an edge of one finger of each pair engages the trailing edge of a respective film perforation and an edge of the other finger of each pair engages the leading edge of said respective film perforation, said film engaging edges being tapered in a direction normal to said film strip, and means for actuating said claw to cause said fingers to engage and disengage said film strip perforations.

6. A claw intermittent mechanism as defined in claim 5 in which the film strip engaging fingers are L-shaped in cross section providing horizontally extending surfaces for engaging the edges of a film strip perforation.

ARTHUR F. HAYEK.

REFERENCES CITED

The following references are of record in the file of this patent:

UNITED STATES PATENTS

| Number | Name | Date |
|---|---|---|
| 2,410,962 | Contner | Nov. 12, 1946 |